US006367937B2

(12) United States Patent
Kŏster

(10) Patent No.: US 6,367,937 B2
(45) **Date of Patent: *Apr. 9, 2002**

(54) SUN PROTECTION INSTALLATION COMPRISING SUN PROTECTION LAMELLAE HAVING A TOOTHED UPPER SIDE

(76) Inventor: Helmut Kŏster, Karl - Bieber - Hŏtte 15, 60437, Frankfurt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,789

(22) Filed: Dec. 9, 1998

(30) Foreign Application Priority Data

Dec. 9, 1997 (DE) ........................................ 197 54 575
Jun. 26, 1998 (DE) ........................................ 198 28 542

(51) Int. Cl.$^7$ ................................................ G02B 27/00

(52) U.S. Cl. ......................... 359/601; 359/613; 160/34; 160/166.1

(58) Field of Search ................................ 359/601, 610, 359/613, 591, 596; 160/34, 166.1, 178.1

(56) References Cited

U.S. PATENT DOCUMENTS 3,438,699 A * 4/1969 Seeger ....................... 359/596
4,486,073 A * 12/1984 Boyd ......................... 359/530
4,841,672 A * 6/1989 Nebhuth et al. ............... 49/25

* cited by examiner

*Primary Examiner*—Cassandra Spyrou
*Assistant Examiner*—Mark A. Robinson
(74) *Attorney, Agent, or Firm*—Koda & Androlia

(57) ABSTRACT

The invention relates to sun protection installations comprising reflective sun protection lamellae consisting of portions having a toothed upper side disposed at least towards sun radiation influx wherein the individual teeth are formed of at least two tooth sides, and at least one first tooth side is, at least partly, exposed to sun light irradiation. Sun light irradiation, at least within the first lamella portions, can be retro-reflected by one single reflection into the outer space by the first tooth side having an angle of impact $\alpha_1$. The tooth angle of impact $\alpha_1$ of the tooth sides exposed to the sun light are so selected within the first lamella portions facing the irradiation area that in case of parallel sun light larger angles of impact $\beta$ of the sun radiation are obtained so that inciding sun light may be reflected back, by one single reflection, to the outer space. Second or further lamella portions are so arranged at an angle $\alpha_1$ that small angles of impact $\beta$ on the tooth sides facing the sun will result but the sun light can be reflected into the interior space In any case, tooth angles of impact $\alpha_1$ within the lamellae differ from each other.

22 Claims, 6 Drawing Sheets

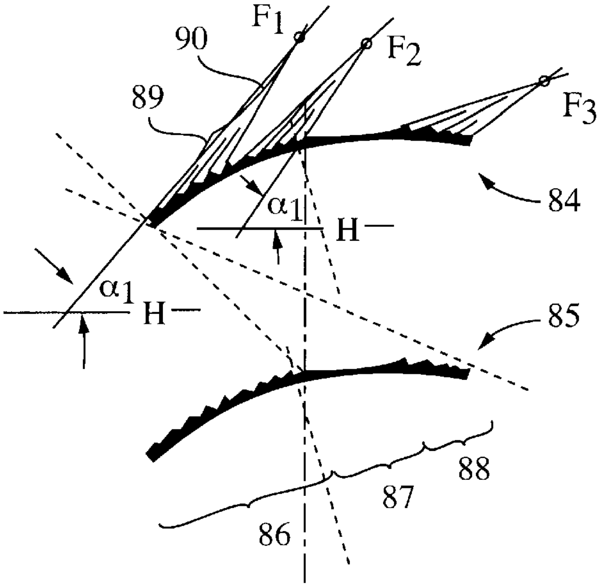
FIG. 10
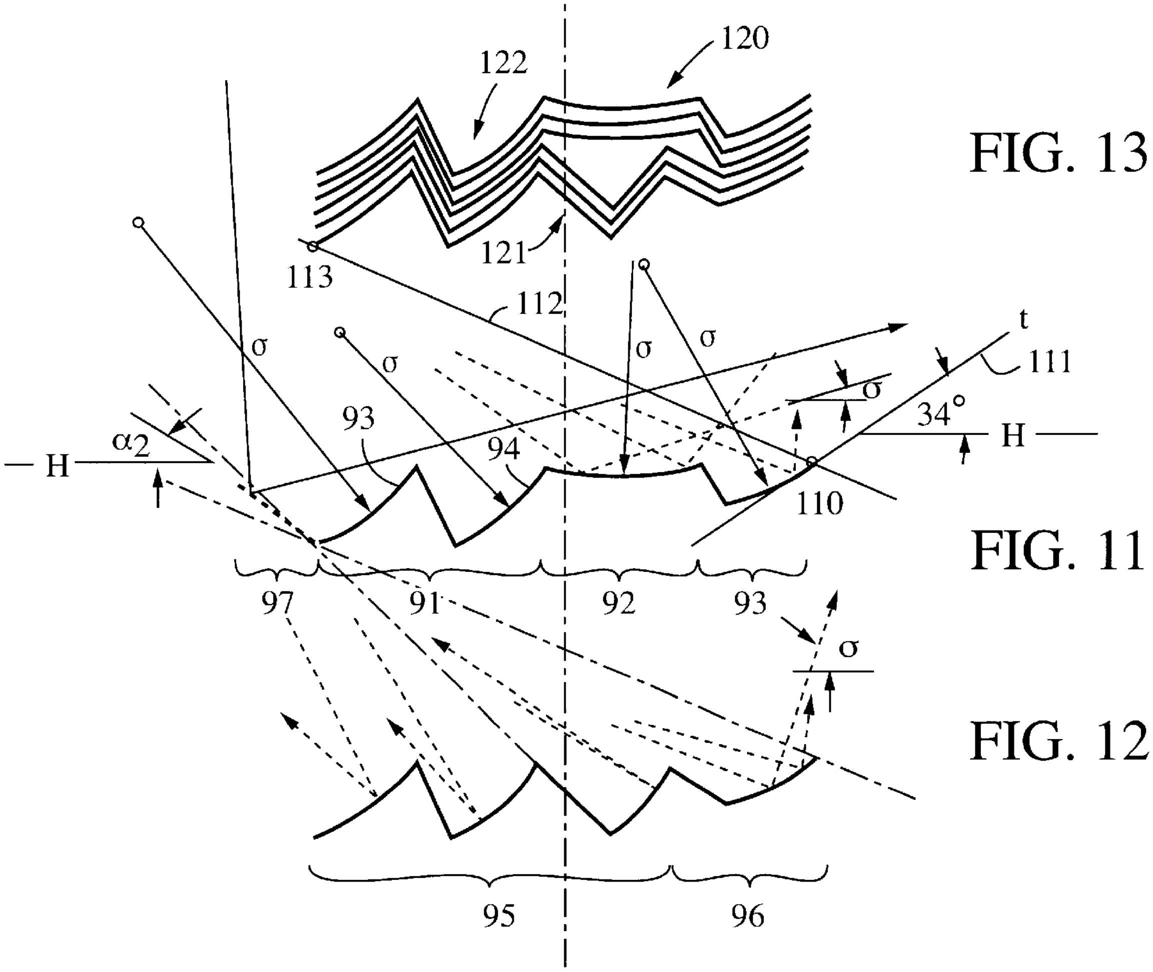
FIG. 13
FIG. 11
FIG. 12

SUN PROTECTION INSTALLATION COMPRISING SUN PROTECTION LAMELLAE HAVING A TOOTHED UPPER SIDE

BACKGROUND OF THE INVENTION

1. Field of the Invention

The invention relates to a sun protection installation.

2. Prior Art

From DE 42 39 003 A1, sun protection lamellae have been known which have a toothed underside and a stepped upper side. The step-shaped upper side is arranged like a staircase so that on the irradiation side of the lamella the sun light incides in principle on the treadboard and the riser, i.e. the whole first portion of the lamella surface is exposed to sun irradiation. This is also the case if the lamella is arched as a whole or sun irradiation penetrates at a high, or flat, respectively, angle of incidence on the lamella.

In DE 44 42 870 A1, sun protection lamellae have been shown comprising two portions, a first step-shaped portion and a second portion. The step-shaped portion is so shaped that light is primarily reflected back into the outer space by two reflections on the upper side of a lamella in that the light is reflected from the treadboard onto the riser, or from the riser onto the treadboard, respectively. Treadboard and riser are exposed to direct sun irradiation.

The disadvantage of this design is an undesirable heating up at the lamella and hence of the interior space since each reflection process is accompanied by a certain absorption. Particularly in the case of interior venetian blinds comprising lamellae, such multiple reflection should be avoided, because it leads to unnecessary heating up and thermal stress of the interior space.

A further problem consists in that this lamella cannot be compacted to vertically suspended lamella packages. While the lamella may be laid one into the other, they slide to the side because of the essentially vertically arranged risers. The disadvantage is that these lamella packages cannot be slid into a venetian-blind chute.

A further disadvantage is that because of the inciding sun, even in case of geometrically correct design of the light deflection on the riser, a glare effect occurs when looking on the venetian blind lamella from above, as is for instance the case when standing behind a lamella curtain in the interior space. Small unevennesses in the reflective surface namely lead to light scattering or an undefined light deflection to the interior space which is experienced as a glare.

SUMMARY OF THE INVENTION

It is therefore the aim of the present invention to develop a sun protection installation comprising reflective lamellae having a step-shaped surface which can reflect sun irradiation, at least for high angles of incidence, by one single reflection again into the outer space while in case of flat angles of incidence, illumination of the space depth is possible as well. A further aim is to provide a reflective lamella which does not lead to glare effects in the interior nor in the outer space.

This problem is solved in accordance with the present invention.

The advantage of the invention lies in the optical heat regulation by the formation according to he invention of the teeth of the first portions in favour of thermal comfort and in the formation according to the invention of the second portions in favour of visual comfort in the interior space. The teeth include a sun-irradiated side and a shaded side. The high overheating summer sun incides on the sun-irradiated side and, apart from a few exceptions, is reflected therefrom by one single reflection into the outer space. To this end, the tooth angles $\alpha_1$ within the first portions should be shaped preferably >30° increasing relative to the second portion. For the critical high positions of the sun, it can thereby be avoided that the light irradiation on the upper side of a lamella is subjected to double reflection. More flatly inciding sun is also subjected, primarily in winter, to a second or further reflections, however on the underside of the upper lamella. By a defined angle of impact $\alpha_1$ of the irradiated tooth sides relative to the horizontal H, the process or the timing of the deflection of the sun light, i.e. the optical behaviour of the lamella, can exactly be defined.

A further advantage of the invention is to be seen in the freedom from glare of the sun protection lamella. In accordance with the invention, the tooth side facing the sun light takes a deflecting function, the tooth side facing the interior space takes a dimming function. From the interior space, at least in the first portion, it is namely not the irradiated side but rather the shaded side of the teeth which is visible. The latter becomes darker and is glare-free since it is irradiated by sun light only immaterially, if at all. With a view to this property, it is possible to provide the lamella either with a reflective surface or with a white or diffuse surface while no glare effect occurs when looking at the lamella. Glare in the outer space, for instance in an opposite building, is avoided in particular because of the different angles of inclination $\alpha_1$ and/or by an arched tooth shape of the sun-irradiated upper sides of the teeth since light deflection occurs diffusely. Second and/or further portions, because of the more flat angle of impact $\alpha_1$ of the sun-irradiated tooth sides, take charge of a light deflection function to the interior space. Preferably, the angles $\alpha_1$ are selected $\alpha_1>0$ and more flat than in the first portion. One exception from the rule may be the starting point of the second portion following the first portion. It may be inclined towards the interior space so that the light is deflected in a very flat way to the interior space.

The sun protection lamella is also arranged as a venetian blind behind a glazing in the interior. With a view to metal oxide coverings, particularly sun protection and heat protection glazings show an increased reflection of the incident light radiation. As a result of retro-reflection of the first portion, reflections of the retro-reflected light radiation on the inner side of the glazings occur. These reflection provoke a glare in the interior space since the sun light is reflected from the glass into the observer's eye. By the different angles of impact $\alpha_1$ of the individual teeth relative to the horizontal in the first portion of the lamellae, this glare is considerably reduced since retro-reflection is scattered and is reflected, with increasing distance from the inner façade, over a larger field of vision. A major part of the reflected retro-reflection is also absorbed by the scattering on the undersides of the upper lamellae. Thereby, too, the glare into the observer's eye is reduced (FIG. 4).

The advantage of the toothed surfaces is particularly to be seen in that the lamella leaf may be arranged in a horizontal position so that good transparency and diffuse light entrance between the lamellae arranged in opened position is safeguarded while, nevertheless, direct sun is deflected out. Would one try to obtain the same optical effect of light deflection by means of a commercially available venetian blind, the lamellae would at least have to be positioned at an angle $\alpha_1$ resulting in that the venetian blind would become intransparent and diffuse light entrance into the interior would be prevented. This common lamella position is for instance shown by dash-dotted line 32 of FIG. 1. The lamella according to the invention is suited for stationarily fixed sun protection installations, for instance also in the shape of a single lamella. In case of rotatable suspension of the sun protection lamellae, for instance in the shape of a venetian blind, the lamella leaf may, in case of high-inciding sun in summer, even be bent inwardly (FIG. 5) so that out-reflection of direct radiation incidence and shading of the interior space occurs, a particularly high permeability for diffuse sun radiation and an even improved transparency of the lamella curtain, however, is safeguarded. This is desirable in order not to darken the interior in spite of the shading. In this way, the lamella may also be continued towards the interior space with a plurality of portions which effect aimed light incidence either into the depth of the interior space or to the interior space ceiling.

Under first portion, one should understand in principle that first portion having a toothed upper side by which in the normal position sun incidence can be back-reflected to the sky by one single reflection. Under further portions, one should understand those lamella portions by which light radiation can be reflected, preferably by one single, or a plurality of, reflections, into the interior space. Under normal position, one should understand a starting angular position of the lamellae for which they are calculated. When pivoting the lamella into a different position, light guiding effects and angular data different from those of the description for the normal position may occur. Usually, the normal position refers to a lamella angular position of from 0–30° to the sun whereby the angular position is determined by a centre line through the lamella relative to the horizontal. However, different lamella position angles are possible as well.

Further advantages will be explained based on the drawings of advantageous embodiment variants.

BRIEF DESCRIPTION OF THE DRAWINGS

FIG. 10 shows a lamella pair having three portions of convex shape.

FIGS. 11/12 show a lamella having parallel upper and undersides.

FIG. 13 shows a lamella package consisting of lamellae for the upper window area and the lower window area.

DETAILED DESCRIPTION OF THE PREFERRED EMBODIMENTS

Figure 1:
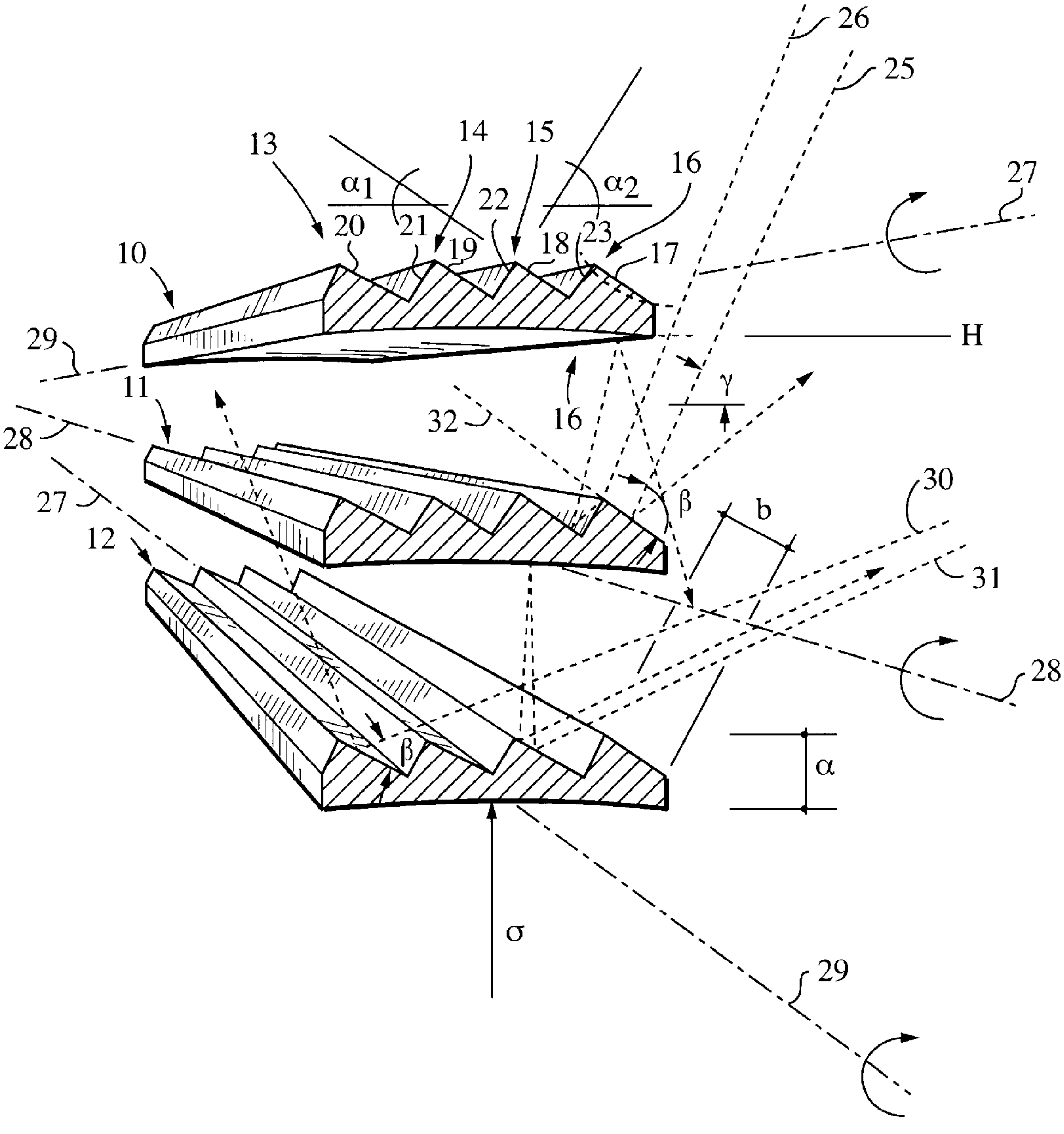
FIG. 1 shows a perspective section through three sun protection lamellae in the normal position for a vertical façade.

FIG. 1 shows lamellae 10, 11, 12 each having four teeth 13, 14, 15 and 16. The teeth have a side 17, 18, 19, 20 facing radiation incidence and a teeth side 21, 22, 23, 24 on the shade side. Tooth side 17 to 20 facing the sun light is arranged at an angle $\alpha_1$ and tooth side 21 to 24 on the shade side at an angle $\alpha_2$. For the determination of angles $\alpha_1$ and $\alpha_2$, it is assumed that the lamella is in the normal position, in the particular case of FIG. 1, in the horizontal position. For this lamella position, it is assumed that $\alpha_1<\alpha_2$, at least within the first portion. Following this rule, then it is possible that the high sun radiation can substantially be reflected to the sky by one single reflection. Of advantage is a shape of the lamella angles $\alpha_1$ of about 30° and larger and $\alpha_2$ of about 60°. Within the second portion, $\alpha_2$ could also take an angular inclination of <0°. As a construction specification, it should be considered valid that $\alpha_1$ increases from the incident area to the second portion and that $\alpha_2$ decreases from the incident area to the second portion.

Following now the radiation paths, it turns out that high-inciding summer sun, represented by ray path 25, is reflected back by one single reflection into the outer space. If the angle of incidence $\gamma$ is greater than the angle of inclination $\alpha_2$ of the portion in the shade, then it turns out for a few radiation portions on ray path 26 that a second reflection onto the angled portion occurs and the light is deflected onto the underside of the upper lamella. It is only from the underside of the upper lamella that the light is deflected to the outside. Since this concerns only a very small portion of the whole radiation inciding onto the lamella, the basically explained advantages will not be impaired by the multiple reflection at a small portion. Incidentally, this multiple reflection could be avoided in that sun protection lamellae 10, 11 and 12 each are pivoted from their normal position about their horizontal axis 27, 28, 29 to the inside until there is no longer any impact on saw tooth side 21 to 24. As a rule for angle $\alpha_2$ it holds valid that it be selected approximately corresponding to the highest direct sun incidence to be expected on the corresponding tooth 13 to 16 and on the 50th latitude about $\alpha_2$=67° decreasing towards the second portion at the south façade.

The optical behaviour at low angles of incidence is shown on lamella 12. A sun ray 30, 31 is reflected from the sunny side of teeth 17 to 20, depending on the angle of impact, either to the ceiling of the interior space or to the underside of upper lamella 11. Should this reaction be undesired, the lamellae can be pivoted from their normal position about their horizontal axes 27 to 29 to the outside so that a steeper angle of impact $\beta$ will result on sun light-facing tooth sides 19, 20 of the second lamella portion. By a steeper angle of impact it can be reached that the light can also be reflected by one single reflection into the outer space.

Particularly tooth sides 17 to 20 exposed to light incidence may show a convex or concave arching in order to obtain better scattering and hence better freedom from glare in case of retro-reflection to the outer space. The dash-lined concave shape 17 is of advantage. The concave arching avoids that the sun light triggers an extreme glare as parallel light, for instance on a façade on the opposite side. Because of the arching of tooth sides 17–20, the glare effect is considerably smoothed by scattering of the retro-reflection. As angle of incidence $\alpha_1$, one should assume, for a concave shape 17, a chord through the starting and the end point. In this connection, inner and outer edge roundings should be taken into consideration.

The upper sides of lamellae 10, 11, 12 in FIG. 1 are arched, at least partly, so that for the first lamella portion a steeper angle of impact $\alpha_1$ of tooth sides 17, 18 facing the sun and for the second portion a more flat angle of impact $\alpha_1$ of tooth sides 19, 20 facing the sun is obtained. By arching the lamellae, portions 17 to 20 form segments of a curve path of the arch formed for instance about a radius r of the lamella. By the convex arching, larger angles of impact $\beta$ of the sun onto first tooth sides 17, 18 in the radiation area, and more flat angles of impact $\beta$ within the second lamella portion on tooth sides 19, 20 are obtained. The advantageous effect consists in that the sun radiation in the area of the first lamella portion can be reflected back to the outer space because of the larger angle of impact $\beta$ and the light radiation inciding onto the second portion can be deflected, with a view to the smaller angle of impact $\beta$, for improved space depth illumination into the depth of the space and to the interior space ceiling. The unambiguous surface contour of the teeth consisting of light deflection tooth parts 17, 18, light guide-in tooth parts 19, 20, and light dimming tooth parts 21, 22, 23 also permits that the surface may be provided in white or reflector-mat while no considerable scattering losses are experienced.

Figure 4:
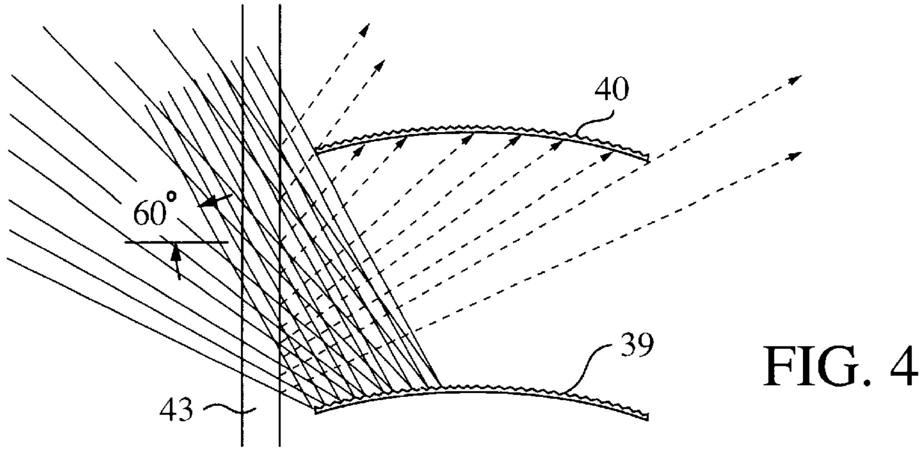
FIGS. 2, 3, 4 and 5 show the optical behaviour of lamellae, two each arranged one above the other, for different sun angles of incidence and lamella positions.
Figure 3:
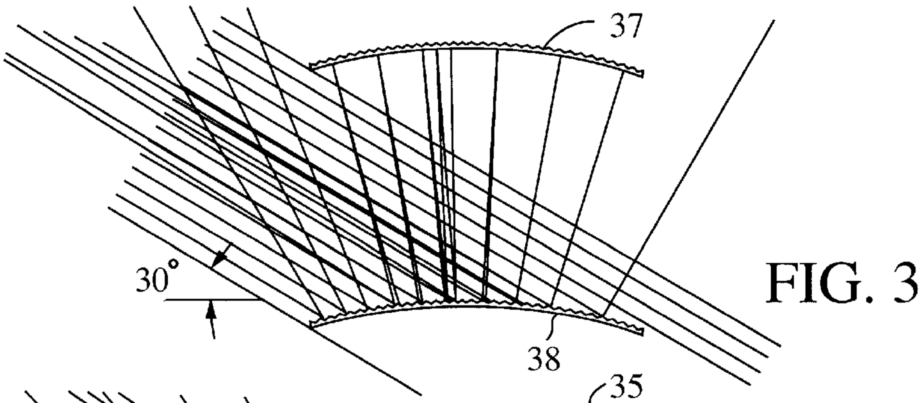
Figure 2:
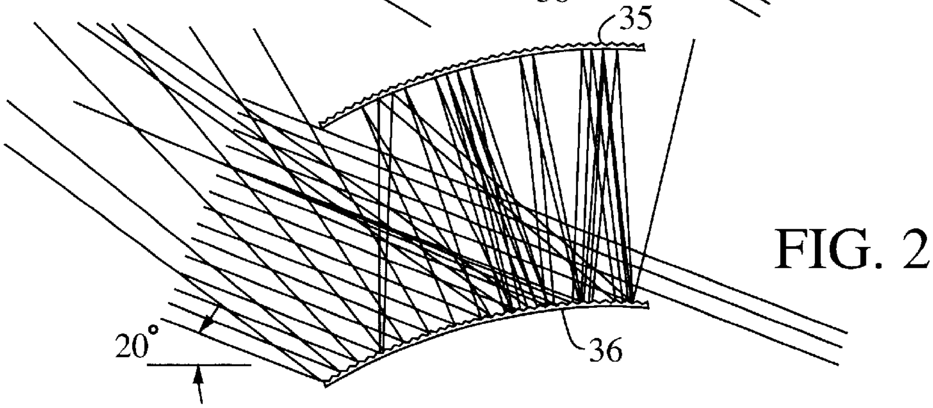

FIGS. 2, 3 and 4 show the optical behaviour of arched lamella pairs 35 and 36, 37 and 38, 39 and 40 at different angles of incidence of the sun. FIGS. 2 and 3 show the radiation path between the lamellae at an angle of incidence of the sun of 20° and 30°, respectively. It turns out that the radiation reflected from the lamella surfaces is reflected via one, or a plurality of, reflections either back into the outer space or very steeply upward into the interior space.

FIG. 4 shows the optical behaviour at an angle of incidence of 60°. The high overheating sun is reflected by one single reflection back into the outer space. Because of the arching of the toothed lamella, the irradiation sides of the individual teeth (17, 18, 19, 20 in FIG. 1) follow a curve path like individual chords. The advantage of the different angles of impact $\alpha_1$ of the individual teeth is the diffuse, or radial, correspondingly, radiation of the retro-reflection so that glare in the outer space is avoided.

The drawing shows a glass pane 43 on the surface of which the retro-reflected radiation is reflected. This reflection constitutes the source of glare when looking from the interior through the window to the outside. By the arching of the lamella and the different angles of impact $\alpha_1$ of the individual teeth, respectively, this glare is, however, considerably reduced because scattering will occur. From the dashed radiation path one can see that by the scattering a major part of the radiation is reflected onto the underside of the upper lamella 40. Following the retro-reflection in FIGS. 2, 3 and 5, one will recognise that the retro-reflections are extremely diffuse because of the lamella arching and partly occur onto the street level and/or into the sky. The arching of the toothed lamella and the different angles of impact $\alpha_1$ of the individual teeth, respectively, constitute a method for glare restriction when looking at the system from a particular position, for instance the street level or from the depth of the interior space.

Figure 5:
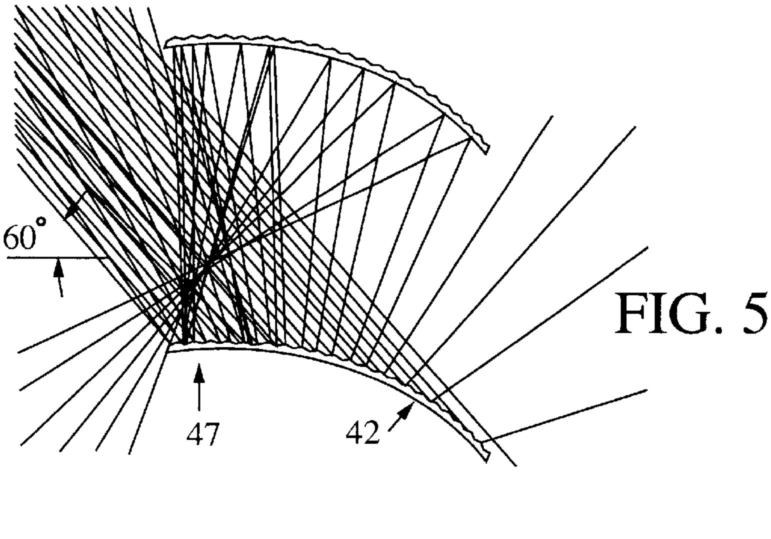

FIG. 5 shows the lamellae in a position pivoted towards the interior space at a radiation entrance angle of 60°. In this position, a particular advantage of the lamella becomes evident. While part of the overheating sun radiation is reflected on first portion 41 into the outer space, a further part inciding onto portion 42 situated towards the interior space is deflected onto the interior space ceiling and into the depth of the interior space.

Figure 6:
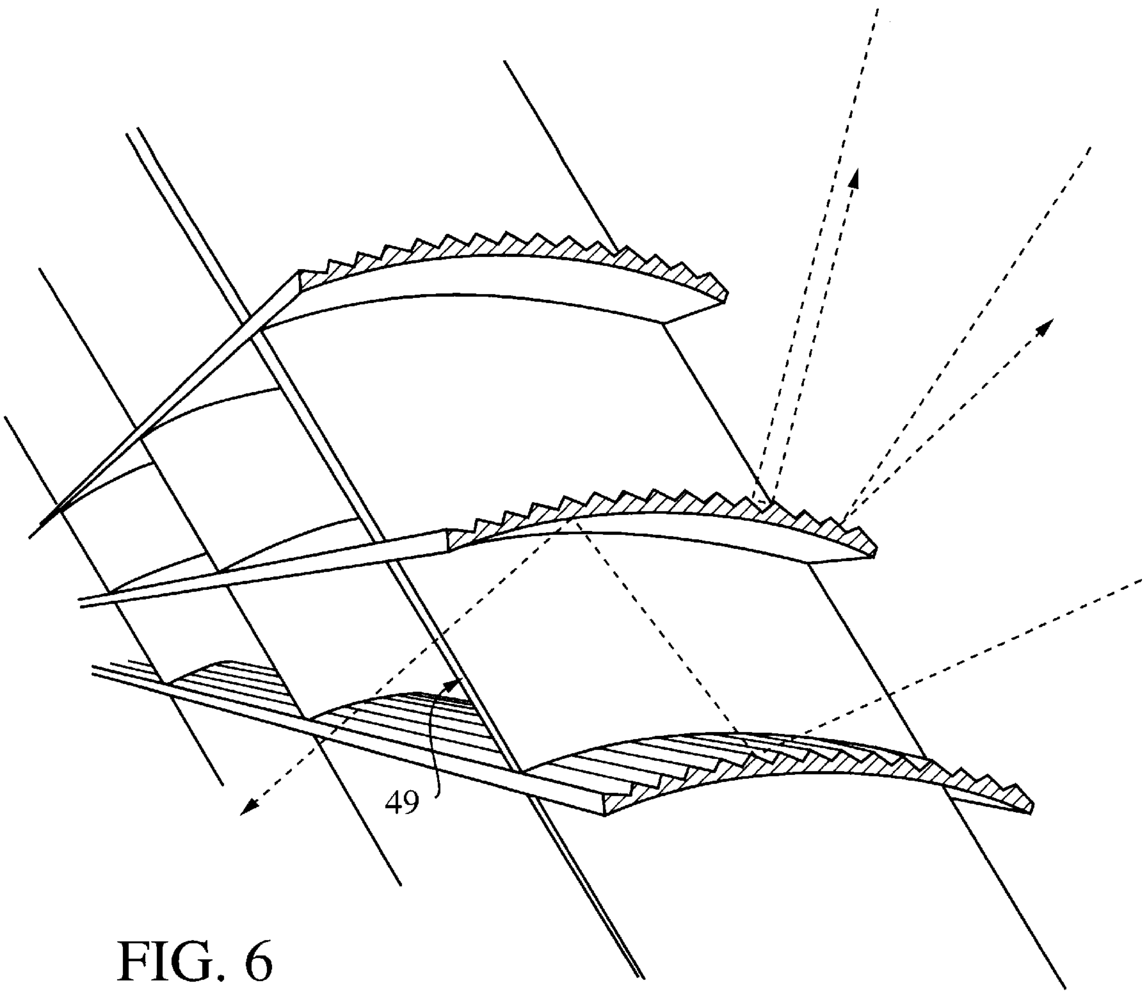
FIG. 6 shows the toothed sun protection lamellae in normal position in an inclined roof surface as a raster element.

FIG. 6 shows the arrangement of the sun protection lamellae on an inclined roof surface. The advantages correspond to those described in connection with FIG. 1. By the saw tooth-like shape, an optical narrowing for the light entrance into the interior space is obtained while no concentration cross section has to be formed between the lamellae. The good transparency between the narrow lamellae and a wide opening between the lamellae for the diffuse light are therefore retained. In spite of the large opening, the light entrance for the direct, glaring and overheating sun radiation into the interior space is reduced.

The sun protection lamellae according to the invention can also be shaped a raster element in that it is preferably orthogonally penetrated, as shown in FIG. 6, by further lamellae 49. The orthogonally arranged lamellae, too, may be provided on one or on both sides with a saw tooth profile. Such a raster element may preferably be installed in insulating glass and arranged on a roof surface so that the resulting light chutes open either to the south for the generation of solar energy or to the north for deflection of direct sun and are permeable only for the diffuse zenith and northern light radiation. The raster element may also be installed in the vertical façade. The horizontally arranged lamellae may take any desired inclination relative to the façade level. The orthogonally penetrating lamellae are preferably arranged perpendicularly to the façade level.

For better deflection of side light, the orthogonal lamellae 49 may also be pivoted about their longitudinal axis from the surface normal with an angular inclination relative to the roof or façade level. It might for instance be necessary to pivot the orthogonal lamellae 49 about their longitudinal axis in order to deflect, for instance on a façade facing west, the sun from south west. In this case, the lamellae are pivoted, for instance about approximately 45° with one flat side towards south west so that the south west sun cannot penetrate and from the interior space the view is open to north west direction. Similar design considerations may also be realised for roof surfaces with the aim of deflecting the direct sun from south east through south west and to make the raster element permeable for northern light only.

Figure 7:
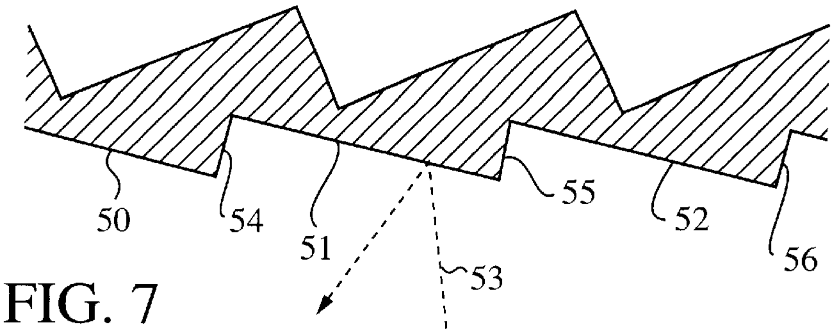
FIG. 7 shows a cross section through a lamella having a staggered tooth arrangement on the lamella upper and underside.

FIG. 7 shows an advantageous embodiment of the underside. Contrary to the figures described, the underside shows an opposed arrangement of the teeth. The arrangement of a plurality of sun protection lamellae one upon the other results again in an optical narrowing for the light entrance from the outside while the lamellae need not be suspended in narrowed arrangement or have to form a concentration cross section. Light radiation 53 reflected from the upper side of one lamella onto the underside of the upper lamella may be guided by two reflections back into the radiation direction while no multiple reflection between the lamella as in FIGS. 2, 3 and 5 and hence undesired heating up of the lamellae occurs since, at each reflection, a certain part of the radiation is absorbed. A further advantage is the glare freedom in the interior. Looking at the lamella from the interior space, one may have in spite of the reflective surface a dark glare-free view of the underside of the lamella since the tooth-shaped portions 54, 55, 56 are disposed in the shadow of the tooth portions 50, 51, 52, or the day light, respectively.

Figure 8:
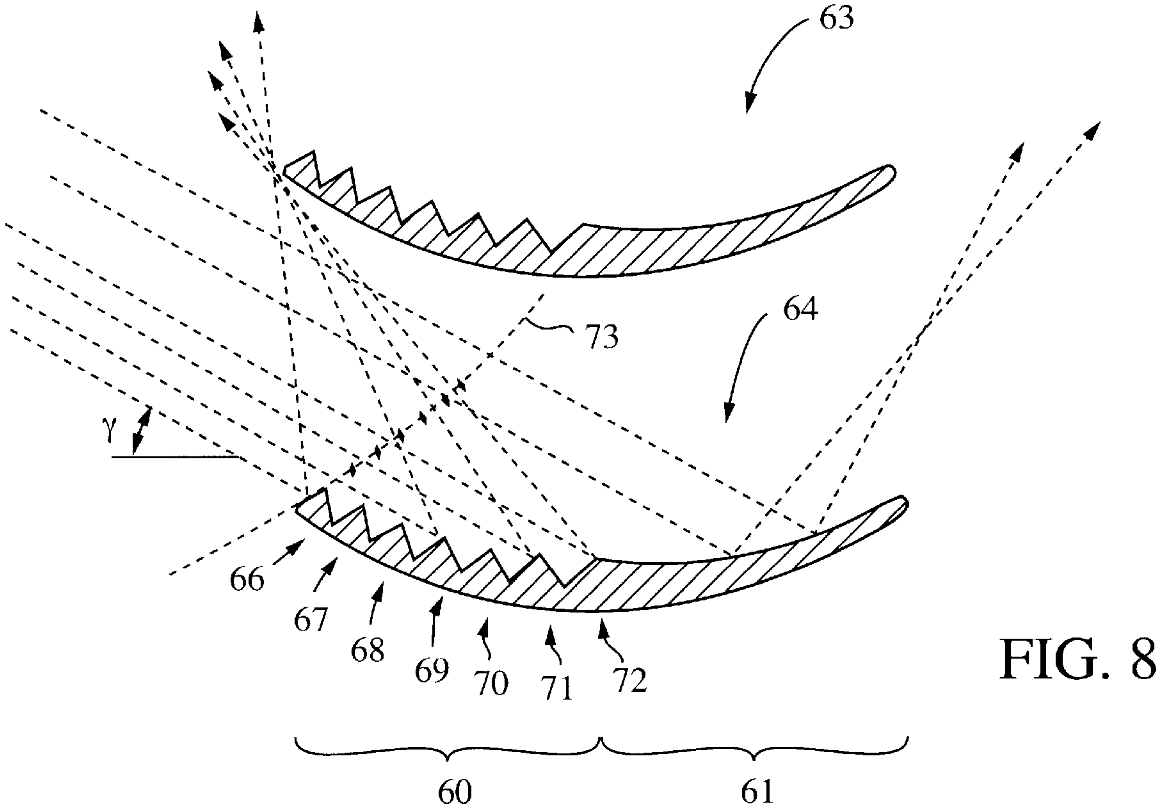
FIG. 8 shows the cross section through a concavely arched lamella pair having a second arched lamella portion without teeth.

FIG. 8 shows a lamella pair wherein the first portion of lamellae 60 is toothed and the second portion 61 is concavely shaped. Lamellae 63, 64 are completely concave-shaped. The sides of teeth 66–72 radiated by direct sun follow an angular position defined by segments on a parabola curve 73. Instead of a concave curve, a convex curve is possible as well. The parabola has its focus in the starting point of the first portion in the irradiation area of the upper lamella, and the inclination of the parabola axis corresponds to $\delta$.

As a construction definition, the following should be considered. An angle of incidence $\gamma$, in the present case $\gamma=30°$, is defined starting from which complete deflection of the incident, parallel sun light irradiation shall occur by only one single reflection. Sun irradiation inciding at an angle <30° is retro-reflected, in FIG. 8, by at least 2 reflections from the upper side of a lower lamella on the underside of an upper lamella into the outer space. As from an angle of irradiation of $\gamma \geqq 30°$, the light is reflected back into the outer space by one single reflection. Irradiation inciding onto the second portion 61 is guided to the interior space.

Figure 9:
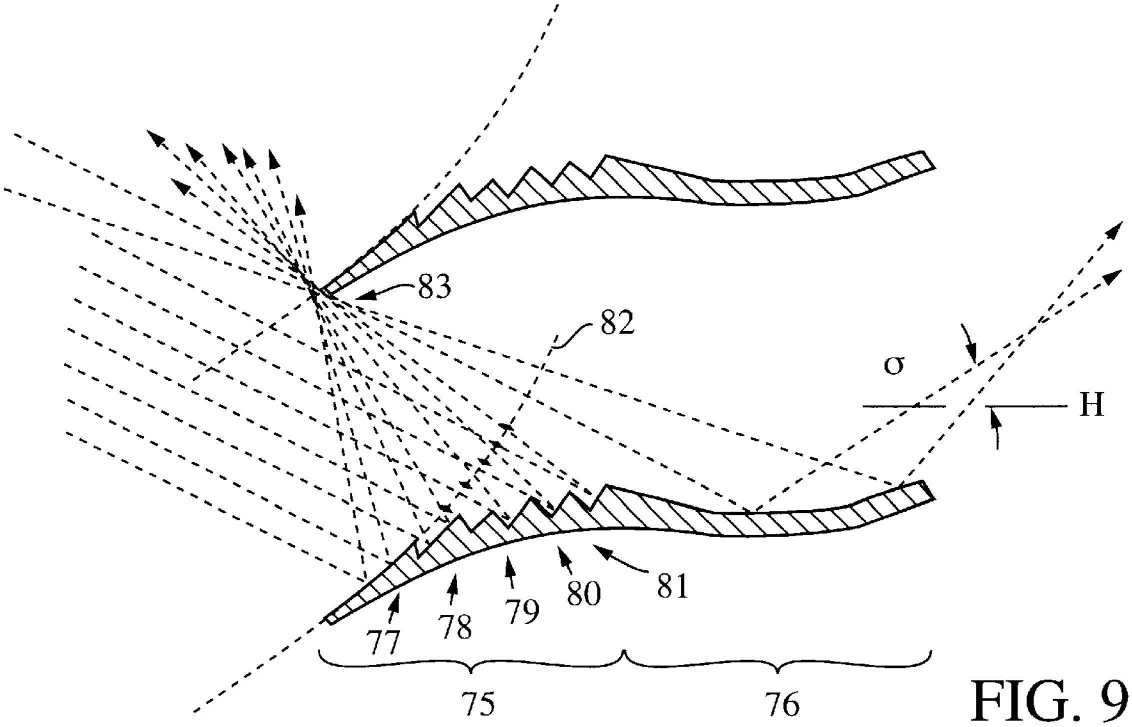
FIG. 9 shows a lamella convexly shaped in its first portion and concavely shaped in second portion.

FIG. 9 shows a lamella formed in S-shape consisting of two portions, 75 and 76. The first portion 75 comprises teeth 77–81 and, contrary to the lamella in FIG. 8, is convexly arched. The angular position of the irradiation sides of teeth 77–81 follows segments at a parabola 82 The tooth sides in the shade are disposed so steeply that, if possible, they are subjected to no or only little direct irradiation. This may for instance be obtained in that the shaded tooth sides are designed as central projection of edge 83 of the upper lamella.

Second portion 76 is shaped as a segmented concave mirror.

FIG. 10 shows a further lamella pair 84, 85 wherein the first portion 86 serves for light deflection, the second and third portion, 87 and 88, serves for the light influx into the interior space. While by the second portion 87 the light is flooded in a very flat manner into the interior space, the light is deflected in a very steep manner to the ceiling by the toothed third portion 88. The lamellae are all provided in a convex shape. For the first portion, a further design method was applied: The tooth sides subjected to the sun light align into points $F_1$, and $F_2$. In the case of projection of the tooth upper sides on a curve 89, 90, a discontinuous curve path is obtained. This leads to an improved scattering of the retro-reflected radiation. The third portion 88, too, is designed in that the individual irradiated tooth sides align into a point $F_3$. The angle of impact $\alpha_1$ increases within first portion 86 essentially towards the second portion.

FIG. 11 again shows a further advantageous variant of the lamella according to the invention, comprising three portion 91, 92 and 93. Analogously to FIG. 10, the first portion 91 is tooth-shaped, the second portion 92 is convexly shaped for flat light influx in the space depth and portion 93 again is tooth-shaped for steep light influx into the interior space. Portion 91 consists of only two teeth having irradiation sides 92 and 94 which are concave-shaped as circular arcs. The arrangement and the shaping of the circular arcs is made according to the rules explained in FIGS. 8 and 9 for the design of circular or parabola arcs 73, 82, or in FIG. 10, of circular arcs 89 and 90, respectively.

FIG. 12 shows a lamella analogously to the design in FIG. 11 having, however, an enlarged first portion 95 and a portion 96 analogously to portion 93 of FIG. 11. The lamella from FIG. 11 is particularly suited for the upper area of a window since the flat light influx leads via the second portion to a very good illumination of the space depth. The lamella of FIG. 112 is better suited for the lower window area. The light flooding into the interior space via second portion 96 enters in such a steep manner that the user of the interior space will not experience any glare. In place of portion 92 from FIG. 11, the first portion in FIG. 12 was elongated and a third tooth for light deflection into the outer space was provided. A lamella without second portion 96, i.e. without light guidance into the interior space, constitutes an object of the invention as well.

In FIG. 13, the lamellae from FIGS. 11 and 12 are shown as venetian blind in a stacked state. The particular feature of this design is seen in that the lamellae for the upper window area 120 and the lamellae for the lower window area 121 may be laid into each other. A further particularity consists in that, because of the special shape of the individual teeth, the lamellae intermesh with each other so that the venetian blind in the stacked-together state constitutes a perpendicularly suspended lamella package. This is obtained by at least one V-shaped formation 122, in the present case of first portion 91 or 95 from FIGS. 11 and 12, respectively.

Figure 14:
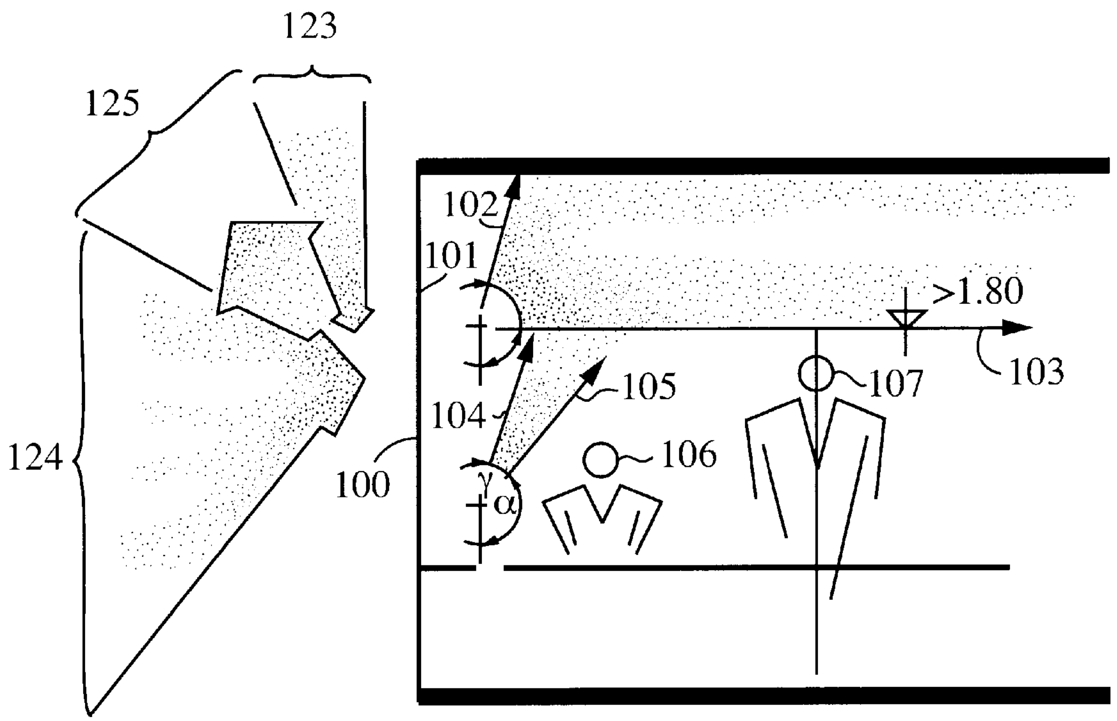
FIG. 14 shows the cross section through a window zone with the light-technological requirements for light deflection of the daylight.

FIG. 14 shows the cross section through a window zone with upper window area 101 and lower window area 100. By light arrows 102 and 103, the space illumination by the upper window lamella as a result of the reflection on portion 92 and 95 from FIG. 11 is shown, by light arrows 104 and 105 the light exit of the radiation reflected on portion 96 to the interior space of the lamellae according to FIG. 12 is shown. The portion(s) disposed towards the interior space serve for visual comfort. By carefully designing the lamella contours, it can be safeguarded that the lamellae are deglared from the interior space, i.e. that light exit occurs, in a controlled way, to the ceiling and into the depth of the space and no glaring light radiation will enter the users' eyes 106, 107 through the undersides of the upper lamella since the design according to the invention prevents that light radiation incides onto the underside of the upper lamella.

Figure 15:
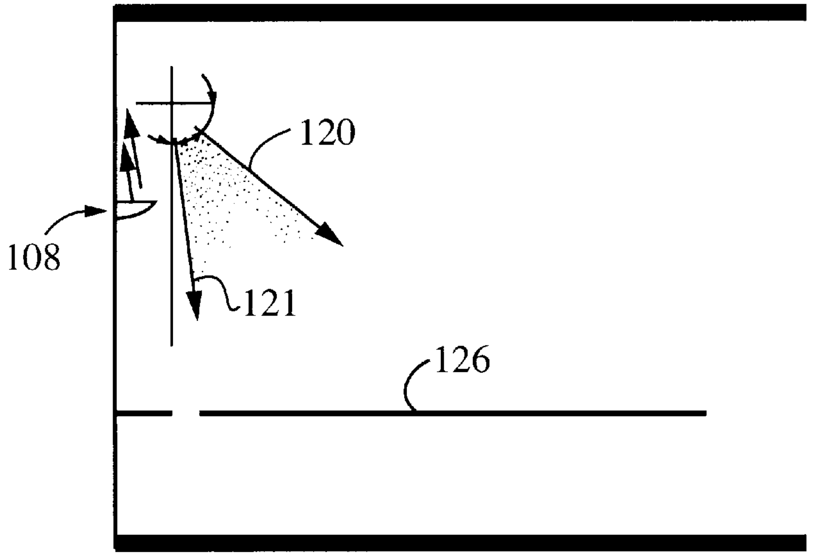
FIG. 15 shows the deflection angle of the day light system for the indirect artificial light.

FIG. 15 shows a particularity of the lamellae from FIG. 11 and FIG. 12. The lamella curtain may for instance be irradiated indirectly from below by artificial light radiation from the breast height or from the window head height in that, at breast height or window head height in parallel to the window level, a punctiform or a linear light source 108 is arranged which radiates the light, at least partly, indirectly into the lamellae. Indirect light radiation incides essentially on the underside of the last portion 93 from FIG. 11 and 96 from FIG. 12, respectively, directed towards the interior space. Not only are these portions shaped so that they guide the daylight at the upper side into the interior space but also the artificial light at the underside, free from glare, to the work level, as in accordance with the regulations of DIN 5035. This is at least valid for lamellae at a larger distance from the light source. To this end, the last portion 93, 96 from FIGS. 11 and 12 is arranged at an angle of inclination of approximately 15–40°. Tangent 111 for instance has at its end point 110 an angle of inclination of 34° for a shadow line 112 of 25° through the starting point 113 of an upper lamella. Hereby, it is reached that the artificial light in the area of light radiation 120, 121 is deflected to working level 126.

A further embodiment variant is shown in dashed lines in FIG. 11 and provides that, in front of first portion 91 towards the outer space, a portion 97 is provided at an angle $\alpha_2$ of approximately 40° through which zenith radiation can be deflected in a flat manner between the lamellae into the interior space. Very flat sun radiation at an angle of impact $\gamma<\alpha_2$ is deflected from the underside to the upper side of the lower lamella.

In FIG. 14, the light radiation penetrating from outside on the façade is shown, wherein zenith radiation 123 and more flatly occurring light 124 can be deflected into the interior space and steeper summer sun 126 is reflected back at the first portion into the outer space.

The lamellae may be manufactured by the aluminum extrusion moulding method, the rolling form process or the roller process. Lamellae produced by the roller process are for instance stamped from a flat sheet by means of a calendar roll wherein, in a second step, a stamped flat sheet is cut up to small lamellae. In a third operation step, the lamellae are shaped to a concave or convex form by a rolling form process. It is also possible to process band material cut to lamella width as a coil and to feed the belts to a rolling mill through which they are shaped, in one single working step, to the concave or convex form, and at the same time the teeth are embossed.

The lamellae may have any dimension. Sun protection lamellae arranged behind the façade are for instance 20 to 100 mm wide while lamellae of the kind of a venetian blind which are inserted into the intermediate space of an insulating glass hardly exceed a lamella width of from 10 to 25 mm. Lamella provided on the outside, for instance as light guiding sword at window head height, may have a width up to two meters or may extend, for instance as a two-part element from the outer space in front of the façade to the interior space behind the façade. It is of particular advantage to make the saw tooth like shape of the surface extremely small so that edge lengths for the saw teeth of b<1 mm up to even b<0.1 mm are obtained. The thickness d of such a lamella would be only 0.3 to 2.0 mm in cross section. Teeth having a lateral length of <0.5 mm are hardly visible by the human eye and have the advantage that in the valleys between the teeth no dust can assemble.

When used in the outer area, such thin lamella may also be embedded as a non-arched element between two plane panes or may at least be covered by a transparent or light-scattering pane. It is also possible to cast, or coextrude, respectively, the lamellae in a transparent plastic material. An advantageous variant is also seen in that at least the toothed side is coated with a transparent film. The air spaces in the area of the teeth may be filled with a transparent adhesive or a cast material, for instance of polyurethane or acrylic. The lamellae may also be cast, extruded or injected of a highly transparent plastic material and made reflective on the reverse side, for instance by metallizing.

By the casting-in, the radiation path of retro-reflection changes because of prismatic effects. The basic laws of light deflection and shading, however, remain valid. It should, however, be noted as an advantage that by the additional prismatic effects a still better scattering of the radiation is experienced and the lamella gains additional stiffness.

The calendar-processed thin metal plates may be applied, for instance by gluing, onto a carrier lamella whereby the thickness d may become substantially bigger. A lamella according to FIG. 7 may be produced by gluing the reverse sides of 2 counter-twisted sheets.

Further production methods for the lamellae include aluminum extrusion moulding and polishing, plastic material extrusion including reflective film covering or thermal methods such as deep drawing or pressing of a plastified film in a tool wherein, in a step before or after the process, the film material is coated with a reflective foil. The lamella undersides may be coloured or white.

What is claimed is:

1. Sun protection installations comprising reflective sun protection lamellae (10, 11, 12, 35, 36, 37, 38, 39, 40, 42, 63, 64, 84, 85), first lamellae portions (60, 75, 86, 91, 95) oriented to an outside and second lamellae portions (61, 76, 81, 88, 93, 96) oriented to an inside, comprising:

a) portions having teeth with an upper side disposed at least towards sun irradiation influx, wherein b) individual teeth (13, 14, 15, 16, 66, 67, 68, 69, 70, 71, 72, 77, 78, 79, 80, 81) are formed of an essentially sun-irradiated tooth side (17, 18, 19, 20) and an essentially shaded tooth side (21, 22, 23), c) at least one sun-irradiated tooth side (17, 18, 93, 94) is arranged, when said reflective sun protection lamellae are in a horizontal position, at an angle $\alpha_1$ to the horizontal and is at least partially subjected to direct sun light irradiation (25, 26), d) tooth angles $\alpha_1$ of sun-irradiated tooth sides (17, 18) are selected to be steeper within said first lamellae portions (60, 75, 86, 91, 95) and are selected to be more flat within said second lamella portions (61, 76, 87, 88, 93, 96), e) sun light irradiation (22, 23), at least within the first lamellae portions (60, 75, 86, 91, 95), can be retro-reflected from the sun-irradiated tooth side (17, 18) by one single reflection to said outside of the reflective sun protective lamellae, and f) at least within the first lamellae portions, $\alpha_1$ is chosen smaller than tooth angles $\alpha_2$ of the shaded tooth side for said horizontal position of the lamellae.

2. Sun protection installations according to claim 1, characterised in that the angles $\alpha_1$ of the sun-irradiated tooth sides (17, 18) essentially increase with increasing distance from the irradiation side.

3. The sun protection installations according to claim 1, characterised in that at least within said first lamellae portions (60, 76, 86, 91, 95), the tooth angles $\alpha_2$ of said shaded tooth side (22, 19, 21) of the individual teeth (13, 14, 15, 16, 66, 67, 68, 69, 70, 71, 72, 77, 78, 79, 80, 81) decrease starting from the sun-irradiated side of the lamellae and are arranged at an angle of $90° > \alpha_2 > 30°$ relative to the horizontal.

4. The sun protection installations according to claim 1, characterised in that the first lamellae portions (91, 95) comprise at least one tooth.

5. Sun protection installations according to claim 1, characterised in that lamellae (84, 86) consist of three, or more, portions (91, 92, 93, 86, 87, 88) wherein at least the first portion (86, 91) is formed tooth-shaped for retro-reflection of the inciding sun irradiation, at least one further portion (87, 92) is formed area-shaped and for light deflection into the interior space and at least the third portion (86, 93) disposed towards the interior space is formed tooth-shaped and for steep light deflection to the interior space ceiling.

6. Sun protection installations according to claim 1, characterised in that at least one portion (93) disposed nearest to the interior space is provided on the underside, at least partly, as a light reflector for artificial light and has an angle of inclination $\sigma$ of from 10°–40° and that at least underneath of parts of said sun protection installation in the interior space punctiform or strip-shaped artificial light sources are arranged and light indirectly emanating therefrom and inciding from below into said sun protection installation is reflected, according to DIN 5035, essentially at an angle $\gamma$, at least by parts of portion (93) disposed nearest to the interior space, and glare limitation according to grade A. 1, 2, of DIN 5035, part 2, part 3, and part 4 is observed.

7. Sun protection installation according to claim 1, characterised in that lamellae of different tooth formation are arranged, at least within the second or further portions (92 and 93, 95 and 96), one under the other, wherein lamellae in the upper window area, at a minimum height of approximately 1.70 m headroom, have at least an angle of inclination of ±5° relative to the horizontal and by which light radiation can be deflected at an angle $\sigma < 45°$ relative to the horizontal into the interior space, and that in the lower window area lamellae are arranged with portions 96 oriented towards the interior space which include exclusively receptor faces at an angle of inclination >25> relative to the horizontal and that sun light radiation inciding on it is deflected at an angle of $\sigma$>45 to the ceiling.

8. Sun protection installations according to claim 7, characterised in that teeth of identical and/or different sun protection lamellae form V-shaped structures within one curtain (FIG. 13).

9. Sun protection installations according to claim 1, characterised in that the lamellae include teeth on the underside thereof, wherein the long portion (50 to 53) of the teeth faces day light irradiation and the short side of the teeth (54 to 56) faces the interior space.

10. Sun protection installations according to claim 1, characterised in that teeth of said first lamella portions (60, 75, 86, 91, 95) exposed to sun irradiation influx each have a width b of <3 mm and the thickness d of the sun protection lamella is <3 mm.

11. Sun protection installations according to claim 1, characterised in that said sun protection lamellae are orthogonally penetrated by further toothed lamellae and form a raster element.

12. Sun protection installations according to claim 1, characterised in that said sun protection lamellae are covered, at least on the upper side, by a light permeable layer.

13. Production of sun protection installations according to claim 1, characterised in that said sun protection lamellae are produced from transparent plastic material having a smooth upper surface and the reverse side is tooth-shaped and made reflective by metal vapour deposition or foil covering.

14. Production of sun protection installations according to claim 1, characterised in that said sun protection lamellae are produced as individual lamellae by thermal softening of a plane plastic material plate and said plates are inserted by vacuum process into a counter mould and solidified in profile shape, wherein said plates are covered prior to heat deformation with reflective foils and by said heat deformation are solidly unified with said plates.

15. Production of sun protection installations according to claim 1, characterised in that said lamellae are covered by a plastic film in that they are inserted into a plastic hose and the film is shrunk on by a thermal process.

16. Sun protection installations according to claim 1, characterised in that said sun protection lamellae have a smooth surface and form a raster element.

17. Sun protection installations according to claim 1, characterised in that said sun protection lamellae are cast in a light permeable plastic material.

18. Production of sun protection installations according to claim 1, characterised in that said sun protection lamellae are produced as plate-shaped lamellae structure by thermal softening of a plane plastic material plate and said plates are inserted by a mould stamp into a counter mould and solidified in profile shape, wherein said plates are covered prior to heat deformation with reflective foils and by said heat deformation are solidly unified with said plates.

19. Production of sun protection installations according to claim 1, characterised in that said sun protection lamellae are produced as individual lamellae by thermal softening of a plane plastic material plate and said plates are inserted by a mould stamp into a counter mould and solidified in profile shape, wherein said plates are covered prior to heat deformation with reflective foils and by said heat deformation are solidly unified with said plates.

20. Production of sun protection installations according to claim 1, characterised in that said sun protection lamellae are produced as plate shaped lamellae structure by thermal softening of a plane plastic material plate and said plates are inserted by vacuum process into a counter mould and solidified in profile shape, wherein said plates are covered prior to heat deformation with reflective foils and by said heat deformation are solidly unified with said plates.

21. Sun protection installations comprising reflective sun protection lamellae (10, 11, 12, 35, 36, 37, 38, 39, 40, 42, 63, 64, 84, 85) comprising:

a) portions having teeth with an upper side disposed at least towards sun irradiation influx, wherein b) individual teeth (13, 14, 15, 16, 66, 67, 68, 69, 70, 71, 72, 77, 78, 79, 80, 81) are formed of an essentially sun-irradiated tooth side (17, 18, 19, 20) and an essentially shaded tooth side (21, 22, 23), c) at least one sun-irradiated tooth side (17, 18, 93, 94) is arranged, when said reflective sun protection lamellae are in a horizontal position, at an angle $\alpha_1$ too the horizontal and is at least partially subjected to direct sun light irradiation (25, 26), d) tooth angles $\alpha_1$ of sun-irradiated tooth sides (17, 18) are selected to be steeper within first lamellae portions (60, 75, 86, 91, 95) and are selected to be more flat within further lamellae portions (61, 76, 87, 88, 93, 96), e) sun light irradiation (22, 23), at least within the first lamellae portions (60, 75, 86, 91, 95), can be retro-reflected from the sun-irradiated tooth side (17, 18) by one single reflection to outside of the reflective sun protective lamellae, f) at least within the first lamellae portions, $\alpha_1$ is chosen smaller than tooth angles $\alpha_2$ of the shaded tooth side for said horizontal position of the lamellae, and g) in the horizontal position said tooth angles $\alpha_1$ of said first potions (60, 75, 86, 91, 95) are formed >25° relative to the horizontal and that angles $\beta$ on further lamellae portions (61, 76, 87, 88, 92, 93, 96) are so formed that rays penetrating into the interior space may be deflected at an angle >0 to horizontal H by one single reflection.

22. Sun protection installation comprising:

a) portions having teeth with an upper side disposed at least towards sun irradiation influx, wherein b) individual teeth (13, 14, 15, 16, 66, 67, 68, 69, 70, 71, 72, 77, 78, 79, 80, 81) are formed of an essentially sun-irradiated tooth side (17, 18, 19, 20) and an essentially shaded tooth side (21, 22, 23), c) at least one sun-irradiated tooth side (17, 18, 93, 94) is arranged, when said reflective sun protection lamellae are in a horizontal position, at an angle $\alpha_1$ to the horizontal and is at least partially subjected to direct sun light irradiation (25, 26), d) tooth angles $\alpha_1$ of sun-irradiated tooth sides (17, 18) are selected to be steeper within first lamellae portions (60, 75, 86, 91, 95) and are selected to be more flat within further lamellae portions (61, 76, 87, 88, 93, 96), e) sun light irradiation (22, 23), at least within the first lamellae portions (60, 75, 86, 91, 95), can be retro-reflected from the sun-irradiated tooth side (17, 18) by one single reflection to outside of the reflective sun protective lamellae, f) at least within the first lamellae portions, $\alpha_1$ is chosen smaller than tooth angles $\alpha_2$ of the shaded tooth side for said horizontal position of the lamellae, and g) disposed towards an outer space in front of said first portions (60, 75, 86, 91, 95) is a receptor reflector arranged at an angle $\alpha_2$ of >0° and by which zenith radiation can be reflected into an interior space.

* * * * *